(12) United States Patent
East

(10) Patent No.: US 6,516,942 B2
(45) Date of Patent: Feb. 11, 2003

(54) IDLER ROLLER FOR TRANSPORT CONVEYOR

(75) Inventor: Charles East, Van Vleet, MS (US)

(73) Assignee: FMC Technologies, Inc., Chicago, IL (US)

(*) Notice: Subject to any disclaimer, the term of this patent is extended or adjusted under 35 U.S.C. 154(b) by 0 days.

(21) Appl. No.: 09/812,599

(22) Filed: Mar. 20, 2001

(65) Prior Publication Data

US 2002/0170805 A1 Nov. 21, 2002

(51) Int. Cl.[7] .................. B65G 15/08; B65G 39/10; B65G 23/04
(52) U.S. Cl. .................. 198/830; 198/835; 193/35 R
(58) Field of Search .................. 198/830, 835, 198/842, 780; 193/35 R, 37

(56) References Cited

U.S. PATENT DOCUMENTS

| | | | | |
|---|---|---|---|---|
| 4,458,957 A | * | 7/1984 | Greener | 277/420 |
| 5,046,869 A | * | 9/1991 | Roberts et al. | 198/842 |
| 5,074,408 A | * | 12/1991 | Smith et al. | 198/842 |
| 5,361,884 A | * | 11/1994 | Yonezawa | 193/35 R |
| 5,642,800 A | * | 7/1997 | East | 193/37 |
| 5,722,888 A | * | 3/1998 | Lane | 193/37 |
| 6,209,702 B1 | * | 4/2001 | Agnoff | 193/35 R |
| 6,287,014 B1 | * | 9/2001 | Salla | 193/37 |

OTHER PUBLICATIONS

*Bulk Conveyors For Bulk Materials*, Fifth Edition, pp. 2–3, 20, 56–57.
Product Brochure, FMC Corporation Link–Belt, 12 pages, 1991.
Epoch Industries web site publication, *Precision Idler Rolls* (page 1 of 1); *About Epoch Industries* (page 1 of 1); *Epoch's Original Bearing Carrier* (page 1 of 1); *Steel Idlers* (pages 1, 2), Copyright 2000.

* cited by examiner

Primary Examiner—Joseph E. Valenza
Assistant Examiner—Gene O Crawford
(74) Attorney, Agent, or Firm—Wood, Phillips, Katz, Clark & Mortimer

(57) ABSTRACT

An improved idler roller for a belt conveyor for conveying bulk materials includes a cylindrical roller shell, and a pair of cast roller heads fitted to respective opposite open ends of the roller shell. Bearing assemblies fitted within each of the roller heads mount the roller for rotation on a pair of stub shafts. Notably, the configuration of the stub shafts and bearing assemblies desirably acts to minimize deflection of the shafts, and thus misalignment of the bearing assemblies. Greater service life for the bearing assemblies, and thus the idler roller, are thus achieved, or alternatively, the rated load for the idler roller, for a given service life, is increased.

10 Claims, 6 Drawing Sheets

FIG_1
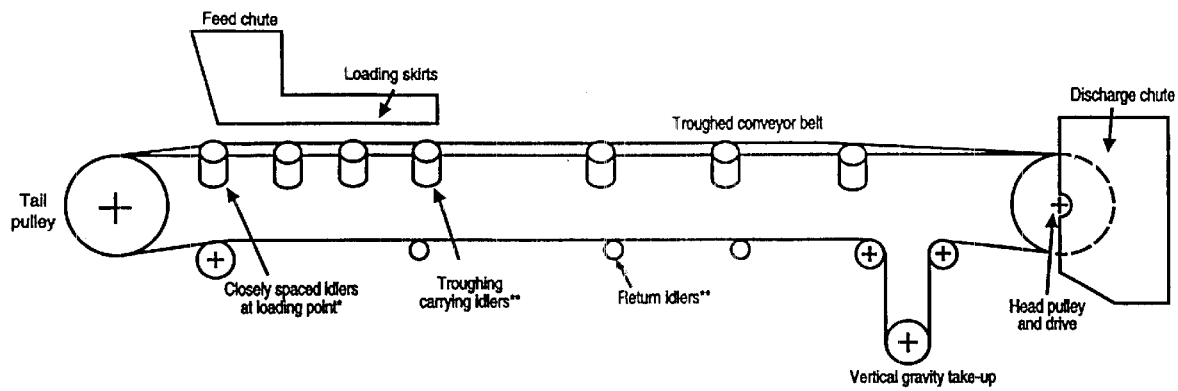
FIG_2
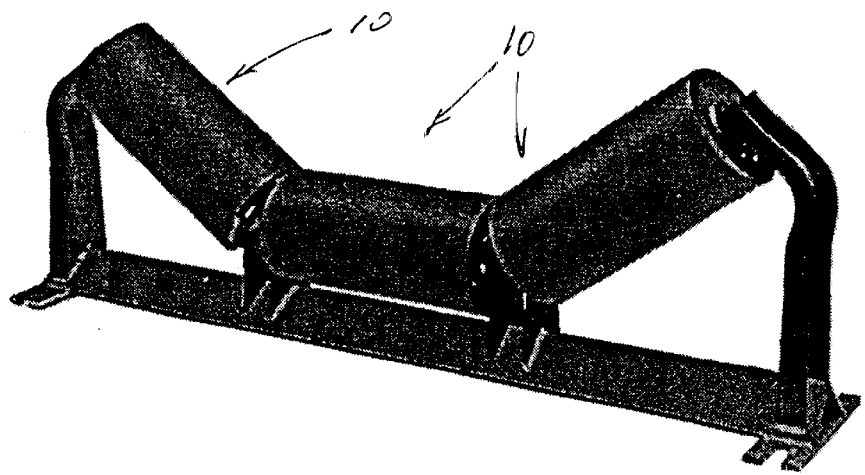

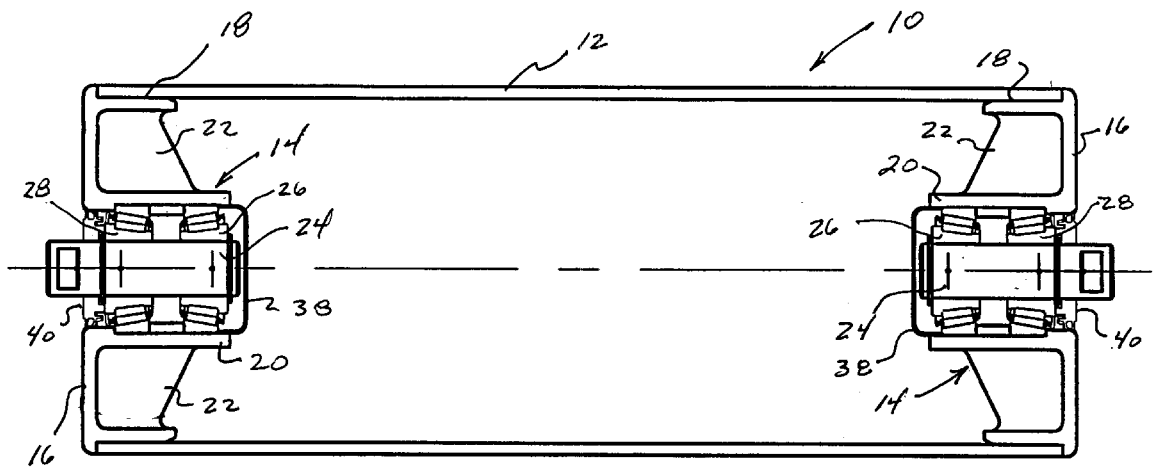
FIG_3
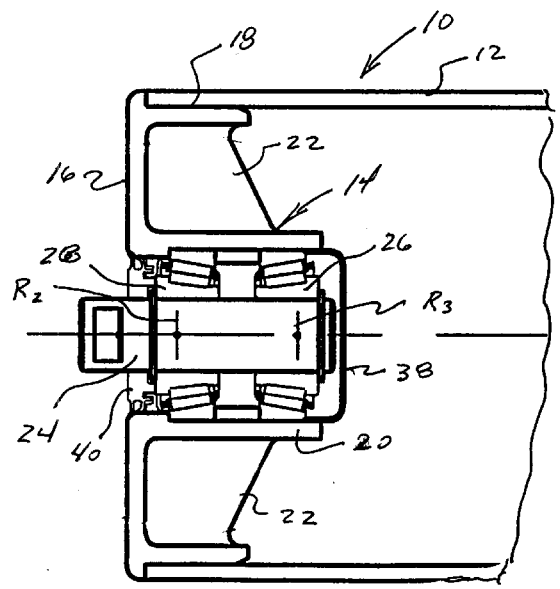
FIG_3a

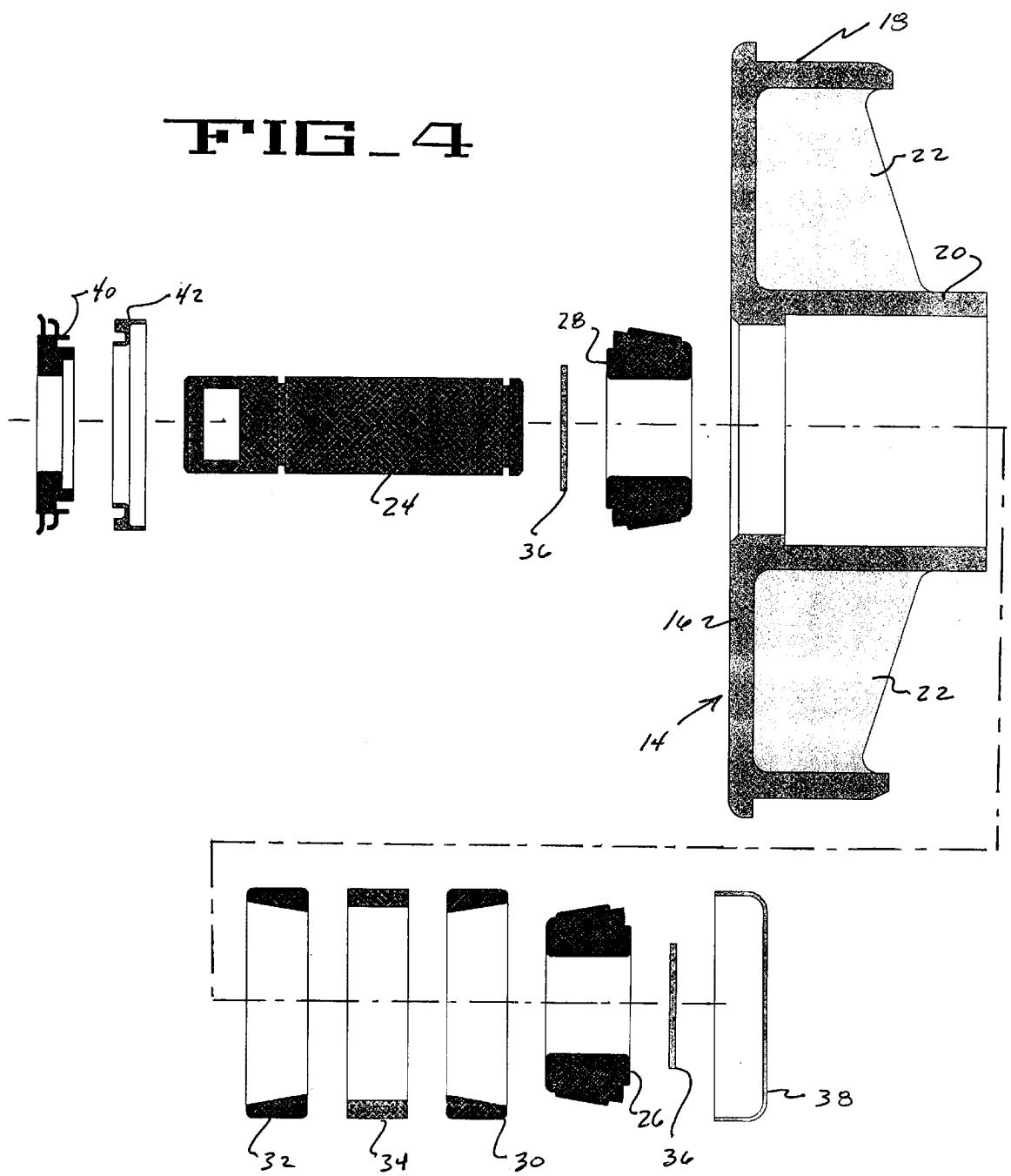

FIG_5

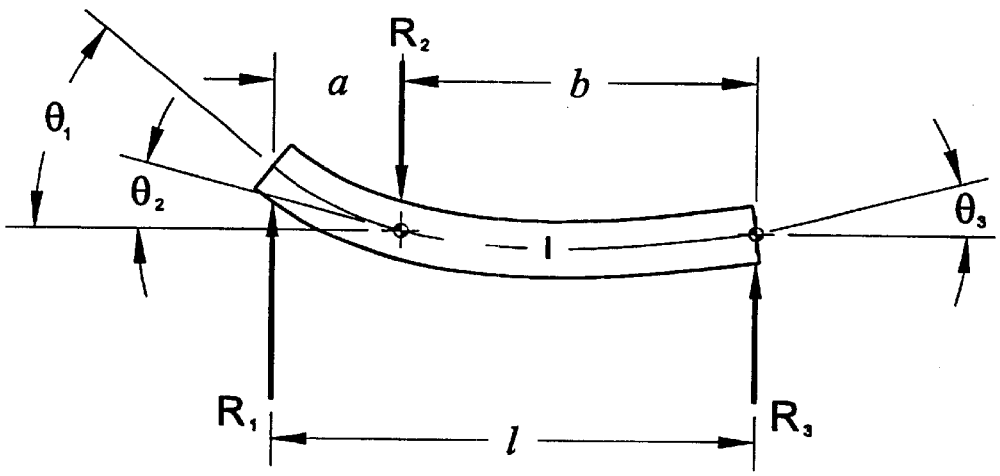

Where:

- $\theta_1$ = Shaft slope at support end ( rad. )
- $\theta_2$ = Shaft slope at outer bearing ( rad. )
- $\theta_3$ = Shaft slope at inner bearing ( rad. )
- $R_1$ = Resultant at support ( lbs )
- $R_2$ = Radial load on outer bearing ( lbs )
- $R_3$ = Resultant at inner bearing ( lbs )
- $a$ = Dimension from bracket to outer bearing resultant ( in. )
- $b$ = Dimension from outer bearing to inner bearing resultant ( in. )
- $l$ = Distance between bracket and inner bearing ( in. )
- $E$ = Modulus of elasticity ( psi )
- $I$ = Moment of inertia ( in.$^4$ )

FIG_6

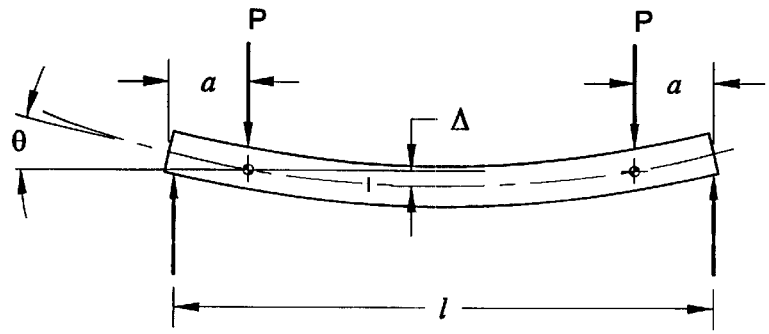

Shaft slope @ $a$, $\theta$ (radians)

$$\theta = \frac{12\,P\,a\,l - 24\,P\,a^2 + w\,l^3 - 6\,w\,a^2 l + 4\,w\,a^3}{24\,E\,I}$$

Shaft deflection @ center, $\Delta$ (inches)

$$\Delta = \frac{48\,P\,a\,l^2 - 192\,P\,a^2 l + 192\,P\,a^3 + 32\,a^3 w\,l - 16\,a^4 w + 5\,w\,l^4 - 16\,a\,w\,l^3}{384\,E\,I}$$

Where :
- $P$ = Radial bearing load ( lbs )
- $a$ = Dimension from bracket to bearing resultant ( in. )
- $l$ = Distance between brackets ( in. )
- $w$ = Shaft weight ( lbs / in. )
- $E$ = Modulus of elasticity ( psi )
  ( $E = 29 \times 10^6$ )
- $I$ = Moment of inertia ( in.$^4$ )

Shaft Slope Equations
(Standard Idlers)

FIG_7

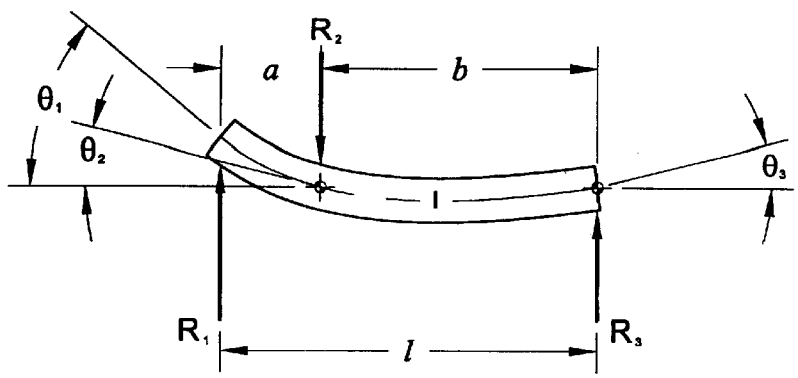

Solve for reactions:

Given maximum allowable load on bearing, $$R_1 = \frac{R_2 \, b}{l} \qquad R_3 = \frac{R_2 \, a}{l}$$

Solve for shaft slopes:

$$\theta_1 = \frac{R_2 \, b}{6\,E\,I}\left(l - \frac{b^2}{l}\right) \quad \text{(at support)}$$

$$\theta_2 = \frac{2\,R_2\,a\,b^2}{3\,E\,I\,l} \quad \text{(at outer bearing)}$$

$$\theta_3 = \frac{R_2 \, b}{6\,E\,I}\left(2\,l + \frac{b^2}{l} - 3\,b\right) \quad \text{(at inner bearing)}$$

Note : Equations and values valid for all belt widths.
Shaft slope due to weight of shaft negligible.

Shaft Slope Equations
(Stub Shaft Idler)

IDLER ROLLER FOR TRANSPORT CONVEYOR

TECHNICAL FIELD

The present invention relates generally to transport conveyors for conveyance of bulk materials such as coal, rock, pulpwood logs, and the like, and more particularly to an improved idler roller for a bulk conveyor which includes stub shafts for enhancing the service life of the associated bearings of the idler roller.

BACKGROUND OF THE INVENTION

Belt conveyors are widely used for transport of bulk materials such as coal, rock, pulpwood logs, and the like, frequently in an outdoor environment. These types of conveyors have attained such widespread use by virtue of their inherent economy, reliability, and versatility. In addition, they are suitable for performing numerous processing functions in connection with their normal purpose of providing a continuous flow of material between operations. More recently, the conformity of belt conveyors to environmental requirements has further enhanced their desirability over alternative means of transport. Low labor and low energy requirements further enhance their versatile and economical use.

For transport of bulk materials, belt conveyors are typically configured to include an upper run along which materials are carried by forming the belt of the conveyor into a trough shape. To this end, a conveyor system includes groups of so-called troughing idler rollers, typically mounted in groups of three, with a pair of upwardly angled idler rollers positioned on opposite sides of a central, generally horizontal idler roller. This configuration of the idler rollers permits the associated belt to assume a trough shape under the weight of bulk materials being transported, with the belt thus being guided and supported by each group of idler rollers.

In typical constructions, the troughing idler rollers of a belt conveyor employ either ball bearings or tapered roller bearings supported by a through shaft or axle inside the idler roll. The shaft is typically stationary, and the bearings allow the roll body and surface (or shell) to rotate about the shaft, thus giving support to the moving conveyor belt with minimum frictional losses. Typically, two bearing assemblies are provided for each roll, one at each end of the roll for mounting on the associated through shaft.

As will be appreciated, the service life of the bearings of an idler roller are critical to the roller's useful life. In this regard, bearing misalignment, caused by shaft deflection resulting from service loading, is one of the principal factors affecting bearing service. In calculating bearing life, the normal service life of a bearing is normally reduced in accordance with expected shaft misalignment resulting from loading.

The present invention is directed to an improved idler roller construction for transport conveyors which includes an arrangement of stub shafts and tapered roller bearings which are configured to minimize shaft deflection and resultant misalignment, thus desirably enhancing the expected service life of the bearings, thereby enhancing the service life of the idler roller assembly.

SUMMARY OF THE INVENTION

An idler roller for a transport conveyor embodying the principles of the present invention includes a cylindrical roller shell having opposite open ends, and a pair of roller heads respectively fitted to the opposite ends of the roller shell. A pair of bearing assemblies are respectively fitted to the pair of roller heads, with a pair of stub shafts respectively fitted in each of the bearing assemblies. The stub shaft idler roller design provides an overall geometry, including the specific locations of the shaft and bearings relative to each other, that desirably acts to minimize the amount of shaft slope or deflection, for a given load, through the bearings, thus extending the service life of the bearings.

In accordance with the illustrated embodiment, each of the bearing assemblies of the idler roller comprises a pair of roller bearings, more specifically, a pair of indirect mounted tapered roller bearings. While tapered roller bearings are particularly sensitive to shaft misalignment, minimization of such misalignment provided by the present invention desirably enhances the service life of the tapered roller bearings.

Further features of the present idler roller construction enhance its reliable operation. The idler roller includes a pair of oil seals each of which extend between a respective one of the stub shafts and the associated roller heads, outboard of the respective one of the bearing assemblies. Each oil seal comprises an outer elastomeric element, typically urethane, having at least one peripheral seal lip for sealing engagement with the respective one of the roller heads. The oil seal further includes an inner element juxtaposed to the outer element to form a labyrinth seal therewith.

In the illustrated embodiment, each roller head of the idler roller comprises a circular end cap portion, and an outer support surface extending inwardly from the end cap portion within a respective open end of the roller shell. Each roller head further includes an inner bearing cavity extending inwardly from the end cap portion within which the respective one of the bearing assemblies is fitted. In accordance with the illustrated embodiment, each of the roller heads includes a plurality of radially oriented reinforcing webs extending between the outer support surface and the inner bearing cavity. The idler roller is thus straightforward and robust in construction, again desirably enhancing reliable operation and long service life.

Other features and advantages of the present invention will become readily apparent from the following detailed description, the accompanying drawings, and the appended claims.

BRIEF DESCRIPTION OF THE DRAWINGS

FIG. 1 is a diagrammatic view of a typical belt conveyor for transport of bulk materials of the type with which the present idler roller is suited for use;

FIG. 2 is a perspective view of a group of troughing idler rollers, each of which can be configured in accordance with the present invention;

FIG. 3 is a cross-sectional view of an idler roller embodying the principles of the present invention;

FIG. 3a is a relatively enlarged, fragmentary view of the idler roller shown in FIG. 3;

FIG. 4 is an exploded, cross-sectional view of a stub shaft and bearing assembly of the present idler roller;

FIG. 5 is a diagram illustrating forces acting upon the stub shaft of the present idler roller;

FIG. 6 shows equations used to calculate shaft slope of a conventional idler roller; and FIG. 7 shows equations used to calculate shaft slope for an idler roller embodying the present invention.

DETAILED DESCRIPTION

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

With reference first to FIG. 1, therein is diagrammatically illustrated a typical belt conveyor system for transport of bulk materials. As shown, a feed chute is positioned for directing bulk materials along the "troughed" upper run of the conveyor for transport of the materials to an associated discharge chute. The belt passes around a head pulley, and through a gravity take-up as the belt moves to and along the return run of the conveyor.

FIG. 2 illustrates a group of troughing idler rollers 10, each of which may be configured in accordance with the present invention. Groups of troughing idler rollers are positioned along the troughed, upper run of the conveyor belt, and conform the belt to a trough-shape for efficient conveyance of bulk materials.

With particular reference to FIGS. 3, 3a, and 4, the present idler roller includes an open ended cylindrical shell 12, and a pair of cast roller heads 14 respectively fitted to the opposite ends of the roller shell 12. Each of the roller heads includes a circular end cap portion 16, and an outer support surface 18 extending inwardly of the end cap portion within a respective end of the roller shell 12. Each of the roller heads further includes a machined bearing cavity 20 extending inwardly from the end cap portions 16, within which bearing assemblies, as will be described, of the idler roller 10 are press-fitted. Each of the roller heads also includes a plurality (typically four) of circumferentially spaced, radially oriented reinforcing webs 22 which extend between the outer support surface 18 and the inner bearing cavity 20.

In accordance with the present invention, the idler roller 10 includes a pair of bearing assemblies respectively fitted within the bearing cavities 20 of roller heads 14, with each of the bearing assemblies in turn mounted on a respective one of a pair of stub shafts 24. The use of stub shafts, in combination with the preferred configuration of the bearing assemblies, as will be described, is specifically configured to reduce the amount of deflection in the shaft, thus yielding less bearing misalignment, which desirably results in longer bearing life. Use of the stub shaft arrangement provides either a longer bearing life for given loads, or permits more load to be supported for a given bearing life.

The bearing assemblies of the idler roller 10 each include a pair of roller bearings, and more specifically, a pair of indirect mounted, inboard and outboard tapered roller bearings, respectively designated 26 and 28. As illustrated in FIG. 4, bearing races 30 and 32 are respectively associated with the bearings 26 and 28, with a spacer 34 positioned therebetween. Snap rings 36 are fitted to each stub shaft 24 for maintaining the tapered roller bearings in position thereon. A rear cap 38 is fitted within the bore of bearing cavity 20 of roller head 16 to retain lubricant within the bearing cavity.

Lubricant is retained within the bearing cavity by the provision of an oil seal fitted to the stub shaft 24 outboard of the tapered roller bearings. In the preferred form, the oil seal comprises an outer elastomeric element 40, such as formed from relatively soft urethane material, with the outer element 40 including at least one peripheral seal lip for sealing engagement with the respective roller head 14. In the illustrated embodiment, the outer element 40 includes a pair of peripheral seal lips for engagement with the roller head 14. Each oil seal of the idler roller 10 further includes an inner element 42 juxtaposed to the outer element 40. The inner element may be formed from polymeric or metallic material, including steel and die-cast zinc. Juxtaposition of the inner element 42 with the outer element 40 forms a labyrinth seal permitting the associated bearing assemblies to be initially lubricated during manufacture of the idler roller, without the need for subsequent lubrication during the service life of the idler roller.

FIG. 5 illustrates the reactive forces on the stub shaft 24 at each end of the idler roller 10, and resultant shaft deflection. As noted, the present invention contemplates that by the provision of stub shafts and cooperating, indirect mounted tapered roller bearings, shaft deflection, and thus bearing misalignment, are minimized, thereby enhancing the service life of the bearings and the idler roller. As noted in FIG. 5, $R_1$ denotes the resultant load at the support at the end of each stub shaft 24, with $R_2$ corresponding to the radial load at the outer bearing 28, and $R_3$ corresponding to the resultant load at the inner bearing 26. As will be recognized by those familiar with the art, indirect mounting of the tapered roller bearings 26 and 28 orients their inwardly tapering conic surfaces toward each other, thus acting to spread the loading ($R_2$, $R_3$) on the associated stub shaft 24, in comparison to direct mounting of a pair of tapered roller bearings. By the present invention, the dimension "b", the distance between the resultant loads on the bearings is maximized, while the dimension "a", from the associated support bracket to the outer bearing resultant, is minimized.

The following analysis compares the loading and deflection of a typical through-shaft roller idler with a roller idler having stub shafts embodying the principals of the present invention. As will be noted, the configuration of an idler roller in accordance with the present invention desirably minimizes shaft deflection to a sufficient degree as to avoid any reduction in the bearing life due to misalignment. These calculations further show than an idler roller configured in accordance with the present invention, for a given bearing service life, permits a relative increase in the service load of the associated conveyor, on the order of 13% increase in accordance with the specific calculations set forth therein.

The Conveyor Equipment Manufacturers Association (CEMA) chooses to use bearing $L_{10}$ life as a guide for establishing idler ratings.

The definition of bearing $L_{10}$ life for belt conveyor idlers is as follows:

The basic rated life (number of operating hours at 500 rpm) based on a 90 percent statistical model which is expressed as the total number of revolutions 90 percent of the bearings in an apparently identical group of bearings subjected to identical operating conditions will attain or exceed before a defined area of material fatigue (flaking, spalling) occurs on one of its rings or rolling elements. The $L_{10}$ life is also associated with 90 percent reliability for a single bearing under a certain load.

The Industry Method is used to calculate the $L_{10}$ life of tapered roller bearings. The Industry Method $L_{10}$ equation is shown below:

$$L_{10} = \frac{(1.5)(10^6)y}{N}\left[\frac{C_{90}}{P}\right]^{\frac{10}{3}}$$

Where:
$L_{10}$=Rated Life (hrs)
$C_{90}$=Bearing Dynamic Load Rating @ 500 rpm for 3000 hrs (lbs)

P=Radial Load on Bearing (lbs)
N=Rotation Speed (rpm)
y=Decimal Percent of Catalog Life The $L_{10}$ equation reveals that for a given bearing ($C_{90}$ constant) with a constant load, P, and a constant speed, N, the $L_{10}$ life is solely dependant on the decimal percent of the catalog life, y. The decimal percent of catalog life for a bearing is a factor of bearing misalignment and is provided by the bearing manufacturer in the form of a graph. The graph below is published for LM11900, LM67000, and L44600 series tapered roller bearings.

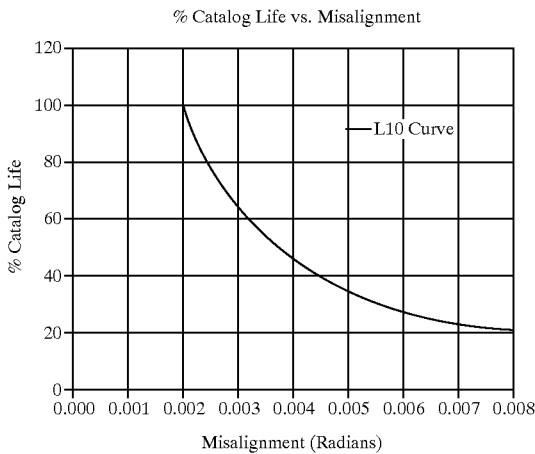

Graph 1: Percent Catalog Life Graph

The curve on the graph indicates the percent reduction in bearing life due to bearing misalignment. From the graph it can be seen that a reduction in bearing life begins when the bearing misalignment reaches 0.002 radians.

A common idler roll consists of a shell with a head on both ends that each house a bearing. A continuous steel shaft runs through the bearings from one end of the idler roll to the other. In some cases the idler roll involves a center tube that is connected to the head and houses both the bearings and the shaft.

Bearing misalignment is caused by shaft deflection. When a load is applied to the roll, the shaft will deflect. The amount of deflection between the bearings, is calculated in order to calculate the slope, of that deflection at the bearing. The slope is also the amount of misalignment in the bearing and is used to obtain the percent catalog life, y, from the graph in FIG. 1. The percent catalog life, y, is then substituted into the $L_{10}$ equation to calculate the expected bearing life.

CEMA classifies idlers according to their load ratings. The load ratings are based on the minimum $L_{10}$ life (in hours) of the bearing rotating at 500 rpm while supporting the rated load. In some instances, specifications will require a minimum $L_{10}$ bearing life. In this situation, the $L_{10}$ life is given and the radial load, P, is calculated. For a given $L_{10}$ life, the radial load, P, then becomes solely dependant on percent catalog life, y. Therefore the percent catalog life, y, which is determined from the slope, of the deflection, in the shaft is a major factor in determining the bearing life, $L_{10}$, and load, P.

The object of the present invention is to reduce shaft slope at the bearing of an idler roll to obtain a larger $L_{10}$ bearing life for a given load or obtain a larger load rating for a given $L_{10}$ life.

BEARING LIFE CALCULATIONS
Effect of Bearing Misalignment on Bearing Life (Constant Load)

The following calculations are presented to illustrate the difference in $L_{10}$ life of an idler roll with a continuous shaft and an idler roll with a stub shaft design. Both idlers will be rotated at the same speed and have identical loading.

STANDARD IDLER ROLL: Continuous Shaft Design

The standard idler roll is for a 54" belt width troughing idler. It is 19.38 inches long and weighs 26.3 pounds. The idler has one LM11900¾" tapered roller bearing in each end. The roll is rotated at 500 rpm with a 867.3 lb load.

STEP 1: Determine Shaft Slope at Bearing

Based on the information given, the shaft slope at the bearing can be determined in accordance with the equations set forth in FIG. 5.

IDLER SHAFT SLOPE
CONTINUOUS STRAIGHT SHAFT
54" BELT WIDTH TROUGHING ROLL
LOAD ON IDLER, LR=867.3 LBS
ROLL WEIGHT (COMPLETE)=26.3 LBS
DIMENSION A=0.9063 IN.
DIMENSION L=19.3800 IN.
SHAFT DIA, D=0.7500 IN.
LOAD AT BRG, P=445.6 LBS
WEIGHT OF SHAFT, W=0.1252 LBS PER IN.
SHAFT MOMENT OF INERTIA, I=0.0155 IN.4
SHAFT SLOPE AT END, ALPHA=0.008366 IN. PER IN.
SHAFT SLOPE AT BRG, THETA=0.007958 IN. PER IN.

The shaft slope at bearing is determined to be 0.007958 IN. PER IN.

SHAFT SLOPE AT BEARING θ=0.007958 radians

STEP 2: Determine Catalog Life Due to Misalignment

The misalignment factor (Percent Catalog Life, y) is obtained from an equation fitted to the curve on the following graph (from Graph 1) provided by the bearing manufacturer.

BEARING $L_{10}$ CURVE EQUATIONS
SERIES LM11900, LM67000, AND L44600 Tapered Roller Bearings

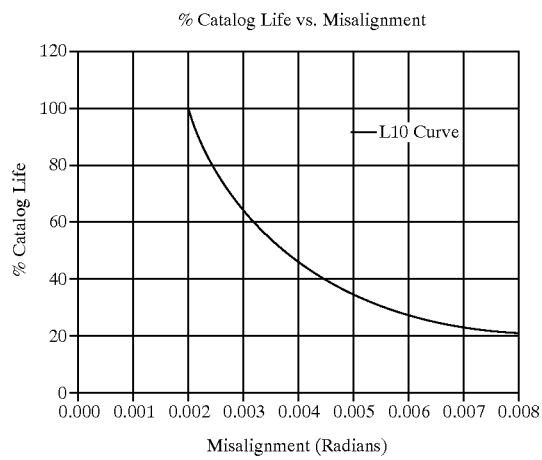

Percent Catalog Life, y $y=0.0008216120340^{-1.14315209}$

Where:
θ=Shaft slope (0.007958 radians) y=0.000821612034 $(0.007958)^{-1.14315209}$ y=0.21=21 Percent Therefore, the Misalignment Factor, y=0.21 y=0.21

STEP 3: Calculate Rated Bearing Life
The Industry method is used for tapered roller bearings.

$$\text{Rated Life } L_{10} \text{ (hrs.)} \quad L_{10} = \frac{(1.5)(10^6)(y)}{N}\left[\frac{C_{90}}{P}\right]^{10/3}$$

Where:
$C_{90}$=Bearing Dynamic Load Rating (1780 lbs) @ 500 rpm for 3000 hrs. (lbs)
P=Radial Load on Bearing (lbs) (445.6 lbs)
N=Rotation Speed (rpm) (500 rpm)
y=Decimal Percent of Catalog Life (0.21)
y≦1.00
Solving for $L_{10}$ $$L_{10} = \frac{(1.5)(10^6)(y)}{N}\left[\frac{C_{90}}{P}\right]^{10/3}$$

$$L_{10} = \frac{(1.5(10^6)(.21)}{500}\left[\frac{1780}{445.6}\right]^{10/3}$$

Therefore, the rated bearing life, $L_{10}$, of a standard 54" belt width idler roll with a continuous shaft supporting 867.3 lbs and rotating at 500 rpm is 63717 hrs.
Rated Bearing Life of Continuous Shaft Design $L_{10}$= 63717.2 hrs.

NEW IDLER ROLL: Stub Shaft Design
The idler roll of the present invention is determined for a 54" belt width troughing idler. It is 19.38 inches long and weighs 26.8 pounds. The idler has two LM11900¾" tapered roller bearings in each end. The roll is rotated at 500 rpm with a 867.3 lb load.

STEP 1 Determine Shaft Slope at Bearing
Based on the information given, shaft slope at the support and at both bearings can be determined. The equations from FIG. 7 are used for calculations. Since the outer bearing experiences the largest load, it has been used to determine bearing life.

IDLER SHAFT SLOPE
STUB SHAFT
54" BELT WIDTH TROUGHING ROLL
LOAD ON IDLER, LR=867.3 LBS
ROLL WEIGHT (COMPLETE)=26.8 LBS
DIMENSION A=0.60125 IN.
DIMENSION B=1.25500 IN.
DIMENSION L=1.85625 IN.
SHAFT DIA, D=0.7500 IN.
LOAD AT SUPPORT, P=447.1
LOAD AT OUTER BEARING, R2=661.3
LOAD AT INNER BEARING, R3=214.2
SHAFT MOMENT OF INERTIA, I=0.0155 IN.4
SHAFT SLOPE AT SUPPORT END, THETA 1=0.0003095 IN. PER IN.
SHAFT SLOPE AT OUTER BRG, THETA 2=0.0004994 IN. PER IN.
SHAFT SLOPE AT INNER BRG, THETA 3=0.0002445 IN. PER IN.
The shaft slope at outer bearing is calculated to be 0.0004994 IN. PER IN.
SHAFT SLOPE AT OUTER BEARING=0.000499 radians Step 2: Determine Catalog Life Due to Misalignment
The misalignment factor (Percent Catalog Life, y) is obtained from simply observing the following graph (from Graph 1) provided by the bearing manufacturer.
BEARING $L_{10}$ CURVE EQUATIONS
SERIES LM11900, LM67000, AND L44600 Tapered Roller Bearings

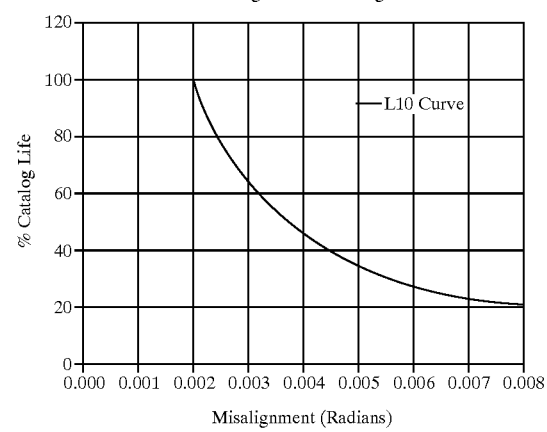

Percent Catalog Life, y
$\theta_2$=Shaft slope (0.000499 radians) is less than 0.002 radians
Therefore, the Misaligment Factor, y=1.0 y=1.0

STEP 3: Calculate Rated Bearing Life
The Industry method is used for tapered roller bearings.

$$\text{Rated Life, } L_{10} \text{ (hrs)} \quad L_{10} = \frac{(1.5)(10^6)(y)}{N}\left[\frac{C_{90}}{R_2}\right]^{10/3}$$

Where:
$C_{90}$=Bearing Dynamic Load Rating (1780 lbs) @ 500 rpm for 3000 hrs (lbs)
$R_2$=Radial Load on Outer Brg (lbs) (663.4 lbs)
N=Rotation Speed (rpm) (500 rpm)
y=Decimal Percent of Catalog Life (1.0)
y≦1.00
Solving for $L_{10}$ $$L_{10} = \frac{(1.5)(10^6)(y)}{N}\left[\frac{C_{90}}{R_2}\right]^{10/3}$$

$$L_{10} = \frac{(1.5)(10^6)(1.0)}{500}\left[\frac{1780}{[500]663.4}\right]^{10/3}$$

Therefore, the rated bearing life, $L_{10}$, of a standard 54" belt width idler roll with stub shafts supporting 867.3 lbs and rotating at 500 rpm is 80526.0 hrs. This is equates to a 26 percent increase in bearing life over the standard continuous shaft design.
Rated Bearing Life of Stub Shaft Design, $L_{10}$=80526.0 hrs BEARING LOAD CALCULATIONS
Effect of Bearing Misalignment on Bearing Load (Constant $L_{10}$ Life)
The following calculations are presented to illustrate the difference in the bearing load rating of an idler roll with a continuous shaft and an idler roll with a stub shaft design embodying the principles of the present invention. Both idlers will be rotated at the same speed and will require a 60,000 hour $L_{10}$ life.

STEP 1: Determine Allowable Bearing Load

The Industry method is used for tapered roller bearings. Solving the $L_{10}$ equation for P we get:

$$\text{Radial Load, } P \text{ (lbs)} \quad P = C_{90}\left[\frac{(1.5)(10^6)}{(L_{10})(N)}\right]^{3/10}$$

Where:

$C_{90}$=Bearing Dynamic Load Rating (1780 lbs) @ 500 rpm for 3000 hrs (lbs)

$L_{10}$=Rated Bearing Life (hrs) (60000 hrs)

N=Rotation Speed (rpm) (500 rpm)

Solving for P $$P = C_{90}\left[\frac{(1.5)(10^6)}{(L_{10})(N)}\right]^{3/10}$$

$$P = 1780\left[\frac{(1.5)(10^6)}{(6000)(500)}\right]^{3/10}$$

$$P = 724.6 \text{ lbs.}$$

According to the $L_{10}$ life equation, the bearing can support a radial load of 724.6 lbs for 60,000 hrs rotating at 500 rpm. The percent catalog life variable, y, was removed from the equation, and therefore did not account for reduction in bearing life due to misalignment. Since the bearing misalignment is actually the slope of the deflection in the shaft due to the allowable load, the shaft slope at the bearing must be calculated for each design. If the shaft slope due to the 724.6 lb load is less than 0.002 radians, then the percent catalog life, y, will be 1.0. This means there will be no reduction in bearing life due to misalignment and the allowable load may be used to calculate the load rating of the idler roll. If the slope is greater than 0.002 radians, the load must be reduced to allow for the reduction in catalog life to obtain the required 60,000 hour $L_{10}$ life.

STEP 2: Determine Shaft Slope Due to the Allowable Load

PRESENT IDLER ROLL: Stub Shaft Design

Solving the equation for the slope at the outer bearing, $\theta_2$, from FIG. 5 yields a shaft slope of 0.000547 radians. The graph in FIG. 1 depicts that a reduction in bearing life due to misalignment does not occur for a misalignment less than or equal to 0.002 radians. The shaft slope, $\theta_2$, is less than 0.002 radians, so there is no reduction in the bearing life due to bearing misalignment (y=1.0). Therefore the 724.6 radial load can be used to calculate the load rating of the idler roll.

STANDARD IDLER ROLL: Continuous Shaft Design

Solving the equation for the slope at the bearing, $\theta$, from FIG. 6 yields a shaft slope of 0.012916 radians. The shaft slope, $\theta$ is greater than 0.002 radians, so there is a reduction in the bearing life of 12 percent due to bearing misalignment (y=0.12). Therefore the 724.6 radial load must be reduced and a new percent catalog life, y, must be calculated to meet the 60,000 hour $L_{10}$ requirement. The calculations in step one and two are repeated by reducing radial load and iterating the percent catalog life, y, until the 60,000 hour $L_{10}$ requirement is met. After calculating, the allowable radial load, P, was determined to be 433.7 lbs with a percent catalog life, y, of 0.19. The 433.7 radial load can now be used to calculate the load rating of the idler roll.

STEP 3: Calculate Load Rating

STANDARD IDLER ROLL: Continuous Shaft Design

The standard roll has one bearing at each end. Each bearing can support 433.7 lbs while rotating at 500 rpm and maintaining an $L_{10}$ life of 60,000 hours. Since each bearing is supporting half of the load on the roll, the roll can actually support a 867.4 lbs (2×433.7 lbs). CEMA requires that the center roll be able to support 70% of the total load that is on the idler. Therefore an idler containing the standard roll would have a load rating of 1239 lbs (867.4/0.70).

Load Rating of Standard Idler Roll, L=1239 lbs

PRESENT IDLER ROLL: Stub Shaft Design

The stub shaft roll has two bearings at each end. The outer bearing must support 724.6 lbs while rotating at 500 rpm and maintaining an $L_{10}$ life of 60,000 hours. The load at the outer bearing is used to solve for the reaction at the supports, $R_1$, shown in FIG. 7. This equates to a 489.9 lb load at the support. Since the load at the support is actually half of the load supported by the roll, the load on the roll is 979.8 lbs (2×489.9). Therefore an idler roller having stub shafts embodying the present invention would have a load rating of 1400 lbs (979.8/0.70). This is an increase of 13 percent over an idler with standard rolls.

Load Rating of New Idler Roll, L=1400 lbs

From the foregoing, numerous modifications and variations can be effected without departing from the true spirit and scope of the novel concept of the present invention. No limitation with respect to the specific embodiment disclosed herein is intended or should be inferred. The disclosure is intended to cover, by the appended claims, all such modifications as fall within the scope of the claims.

What is claimed is:

1. An idler roller for a transport conveyor, comprising:
   a cylindrical roller shell having opposite open ends;
   a pair of roller heads respectively fitted to the opposite ends of said roller shell;
   a pair of bearing assemblies respectively fitted in each said roller head, wherein each of said bearing assemblies comprises a pair of roller bearings; and
   a pair of stub shafts respectively fitted in each of said bearing assemblies to minimize deflection of said stub shafts to enhance service life of said bearings.

2. An idler roller in accordance with claim 1, wherein:
   each said pair of roller bearings comprises a pair of indirect mounted tapered roller bearings.

3. An idler roller in accordance with claim 1, wherein:
   each of said roller heads comprises a circular end cap portion, an outer support surface extending inwardly from said end cap portion within a respective open end of said roller shell, and an inner bearing cavity extending inwardly from said end cap portion within which the respective one of said bearing assemblies is fitted.

4. An idler roller in accordance with claim 3, wherein:
   a plurality of radially oriented reinforcing webs extend between said outer support surface and said inner bearing cavity.

5. An idler roller in accordance with claim 1, including
   a pair of oil seals respectively extending between each said stub shaft and a respective one of said roller heads outboard of the respective one of said bearing assemblies.

6. An idler roller in accordance with claim 5, wherein:
   each said oil seal comprises an outer elastomeric element having at least one peripheral seal lip for sealing engagement with the respective one of said roller heads, and an inner element juxtaposed to said outer element to form a labyrinth seal.

7. An idler roller for a transport conveyor, comprising:

a cylindrical roller shell having opposite open ends;

a pair of roller heads respectively fitted to the opposite ends of said roller shell;

a pair of indirect mounted, tapered roller bearing assemblies fitted in each said roller head; and a pair of stub shafts respectively fitted in each said pair of said tapered roller bearing assemblies to enhance service life of said bearing assemblies.

8. An idler roller in accordance with claim 7, wherein:

the distance between resultant loads on said roller bearing assemblies of each said pair is greater than the distance between the resultant load of an outboard one of said bearing assemblies of each said pair, and a resultant load of the respective one of said stub shafts.

9. An idler roller in accordance with claim 7, including:

a pair of oil seals respectively extending between each said stub shaft and a respective one of said roller heads outboard of the respective one of said bearing assemblies.

10. An idler roller in accordance with claim 9, wherein:

each said oil seal comprises an outer elastomeric element having at least one peripheral seal lip for sealing engagement with the respective one of said roller heads, and an inner element juxtaposed to said outer element to form a labyrinth seal.

* * * * *